United States Patent
Marcus

(10) Patent No.: US 9,317,597 B2
(45) Date of Patent: *Apr. 19, 2016

(54) METHOD AND APPARATUS FOR EFFICIENT, ENTERTAINING INFORMATION DELIVERY

(71) Applicant: NTECH PROPERTIES, INC., Oxnard, CA (US)

(72) Inventor: Dwight Marcus, Ojai, CA (US)

(73) Assignee: NTECH PROPERTIES, INC., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,110

(22) Filed: Sep. 23, 2014

(65) Prior Publication Data

US 2015/0199365 A1    Jul. 16, 2015

Related U.S. Application Data

(63) Continuation of application No. 13/195,709, filed on Aug. 1, 2011, now Pat. No. 8,875,185, which is a continuation of application No. 10/874,819, filed on Jun. 23, 2004, now abandoned.

(60) Provisional application No. 60/482,597, filed on Jun. 24, 2003.

(51) Int. Cl.
| | |
|---|---|
| H04N 5/445 | (2011.01) |
| G06F 17/30 | (2006.01) |
| G06Q 20/12 | (2012.01) |
| G06Q 30/02 | (2012.01) |
| H04N 7/173 | (2011.01) |
| H04N 21/258 | (2011.01) |
| H04N 21/431 | (2011.01) |
| H04N 21/4722 | (2011.01) |

(Continued)

(52) U.S. Cl.
CPC .......... *G06F 17/3084* (2013.01); *G06Q 20/123* (2013.01); *G06Q 30/02* (2013.01); *H04N 7/17318* (2013.01); *H04N 21/25883* (2013.01); *H04N 21/25891* (2013.01); *H04N 21/4312* (2013.01); *H04N 21/4314* (2013.01); *H04N 21/4722* (2013.01); *H04N 21/812* (2013.01); *H04N 21/8549* (2013.01)

(58) Field of Classification Search
CPC .................................................. H04N 21/4825
See application file for complete search history.

(56) References Cited

U.S. PATENT DOCUMENTS

| | | | | |
|---|---|---|---|---|
| 6,032,156 A | * | 2/2000 | Marcus | |
| 6,317,784 B1 | * | 11/2001 | Mackintosh et al. | 709/219 |
| 7,877,676 B2 | * | 1/2011 | Munetsugu et al. | 715/204 |

(Continued)

*Primary Examiner* — Junior Mendoza
(74) *Attorney, Agent, or Firm* — Troutman Sanders LLP

(57) ABSTRACT

Embodiments of the present invention are directed to a method and apparatus for efficient, entertaining information delivery. In one embodiment, information is partitioned into clips. Clips are selected for a user and packaged together for presentation to the user in an entertaining manner. In one embodiment, the clips are selected and packaged together in accordance with a template. In another embodiment, information about a user is used to select clips. In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program.

20 Claims, 3 Drawing Sheets

(51) Int. Cl.
*H04N 21/81* (2011.01)
*H04N 21/8549* (2011.01)

(56) References Cited

U.S. PATENT DOCUMENTS 8,875,185 B2 * 10/2014 Marcus ........................... 725/44
2002/0019858 A1 * 2/2002 Kaiser et al. ................... 709/219
2002/0092019 A1 * 7/2002 Marcus ........................... 725/37
2004/0025180 A1 * 2/2004 Begeja et al. .................... 725/46
2005/0262151 A1 * 11/2005 Plastina et al. .............. 707/104.1
2007/0113250 A1 * 5/2007 Logan et al. .................... 725/46
2008/0092168 A1 * 4/2008 Logan et al. .................... 725/44
2010/0049699 A1 * 2/2010 Benschoter et al. .............. 707/3
2012/0180083 A1 * 7/2012 Marcus ........................... 725/32

* cited by examiner

METHOD AND APPARATUS FOR EFFICIENT, ENTERTAINING INFORMATION DELIVERY

CROSS REFERENCE TO RELATED APPLICATIONS

This application is a continuation application of U.S. Patent Application No. 13/195,709 entitled Method and Apparatus for Efficient, Entertaining Information Delivery, filed Aug. 1, 2011, which is a continuation of U.S. patent application No. 10/874,819, filed Jun. 23, 2004, now abandoned, which application claims priority to U.S. Provisional Patent Application No. 60/482,597 filed on Jun. 24, 2003. This application hereby also incorporates by reference the disclosures of U.S. patent application No. 09/896,838 filed Jun. 29, 2001; U.S. patent application No. 09/953,569 filed Sep. 13, 2001; U.S. patent application No. 09/953,086 filed Sep. 10, 2001; and U.S. Pat. No. 6,032,156 filed Apr. 1, 1998. The entire contents of all of the foregoing patents and applications are hereby incorporated by reference herein for all purposes.

FIELD OF THE INVENTION

The present invention relates to the field of information delivery, and in particular to a method and apparatus for efficient, entertaining information delivery.

BACKGROUND OF THE INVENTION

Typical information delivery systems (e.g., the World Wide Web, video on demand, television, etc.) provide information to users inefficiently. Some systems deliver information in a rigid, non-searchable manner that limits the ability of a user to retrieved information of interest to the user. Other systems allow a more flexible search for specific information, but the search is generally performed in a non-entertaining manner and typically requires the user to examine and select from a list of retrieved, potentially relevant items. This problem can be better understood by a review of prior art information delivery systems.

Television Delivery of Information

One of the most commonly used information delivery systems is television. A user selects a channel and information is delivered to their speakers and/or screens. Some means of transmitting the information include broadcast, cable and satellite communications. Channel programming is varied. Some channels carry a specific type of programming (e.g., the History Channel or the Movie Channel) and others carry a mix of programming. However, a user has very little control over what information is presented at a specific time. The user's only control is to change channels. If programming content desired by the user is not currently being delivered by one of the available channels, the user is unable to do anything to prompt delivery of the desired content.

Video on Demand

Video on demand (VOD) enhances the user's ability to control the content of the information delivered by the system. In a VOD system, the user is able to select desired content from a list of available content. The selected program is retrieved by the system and sent to the user. However, VOD systems typically do not provide users with an efficient or entertaining interface for requesting information. A user must search through and select from a list of available content.

World Wide Web

The world wide web is another system for delivering a wide variety of information to system users. Typically, a user locates desired information by typing in a web address, performing a search or following links. This method is similar to the VOID method in that the user has more control over what content is delivered. However, in both systems, information retrieval is inefficient and non-entertaining.

SUMMARY OF THE INVENTION

Embodiments of the present invention are directed to a method and apparatus for efficient, entertaining information delivery. In one embodiment, information is partitioned into clips. Clips are selected for a user and packaged together for presentation to the user in an entertaining manner. In one embodiment, the clips are selected and packaged together in accordance with a template. In another embodiment, information about the user is used to select clips. In one embodiment, clips are associated with headers. One type of header is a content header that describes the content of the clip. Other headers describe aesthetic qualities of a clip. In one embodiment, the clip headers contain both content and aesthetic information.

In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program. In one embodiment, selections made by the user are monitored and used in association with templates to determine which clips will be selected and how they will be presented to the user in the stream of information in the future.

In one embodiment, clips are provided to the user at no cost. In another embodiment, the user pays to view certain clips. In one embodiment, the user pays through a debit to an account (similar to ordering a pay-per-view event). In another embodiment, the user pays by viewing other clips and/or information (e.g., an advertisement). In another embodiment, advertisers pay to have information inserted into the information packaged for streaming to a user, thereby subsidizing the user's information retrieval experience.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention is a method and apparatus for efficient, entertaining information delivery. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

In one embodiment, information is partitioned into clips. Clips are selected for a user and packaged together for presentation to the user in an entertaining manner. In one embodiment, the clips are selected and packaged together in accordance with a template. In another embodiment, information about the user is used to select clips. In one embodiment, clips are associated with headers. One type of header is a content header that describes the content of the clip. Other headers describe aesthetic qualities of a clip. In one embodiment, the clip headers contain both content and aesthetic information.

In one embodiment, a user is presented with a stream of information comprised of clips of information assembled for the user. The user may select a clip to retrieve additional information related to the clip. In one embodiment, the selected clip is a portion of a program (e.g., a television show, a movie, a song, an advertisement, etc.) and the additional information is a larger clip of the program and/or the entire program. In one embodiment, selections made by the user are monitored and used in association with templates to determine which clips will be selected and how they will be presented to the user in the stream of information in the future.

Figure 1:
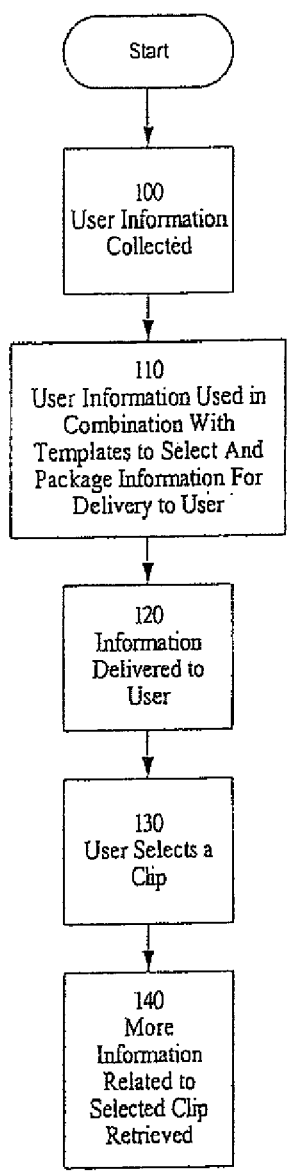
FIG. 1 is a flow diagram of the process of delivering information in accordance with one embodiment of the present invention.

FIG. 1 illustrates the process of delivering information in accordance with one embodiment of the present invention. At block 100, user information is collected. The user information collected varies amongst embodiments. For example, one embodiment collects demographic information (e.g., sex, age, race, geographic location, education level, etc.) about a user as well as information regarding the user's interests and prior history of interaction with the system.

At block 110, the user information is used in combination with templates to select and package the information for delivery to the user. In one embodiment, the templates are used to connect clips in an appealing manner. In another embodiment, the clips also assist in selecting the information (e.g., by placing length and/or style limitations on which clips are eligible to be incorporated at a specific location). In one embodiment, the information is packaged by concatenating clips together to form a stream of data. For example, the clips are media clips and the information is delivered as an observable stream of media (e.g., video and/or audio).

At block 120, the information is delivered to the user. At block 130, the user selects a clip. For example, the user may be interested in learning more about a product displayed in a 6 second clip. At block 140, more information related to the selected clip is retrieved. In the example above, a longer, more detailed ad for the product is retrieved. In another embodiment, the selected clip is a portion of a media program (e.g., a movie or show) and the entire media program is retrieved.

Figure 2:
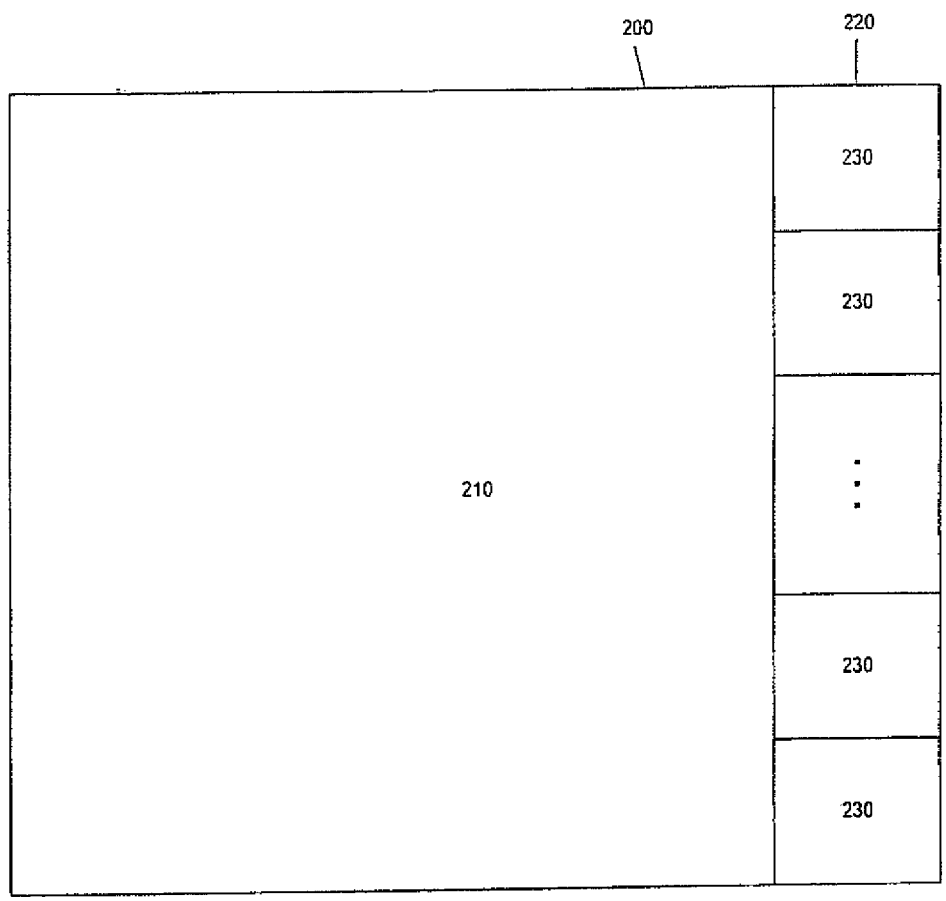
FIG. 2 is a block diagram of an information display in accordance with one embodiment of the present invention.
Figure 3:
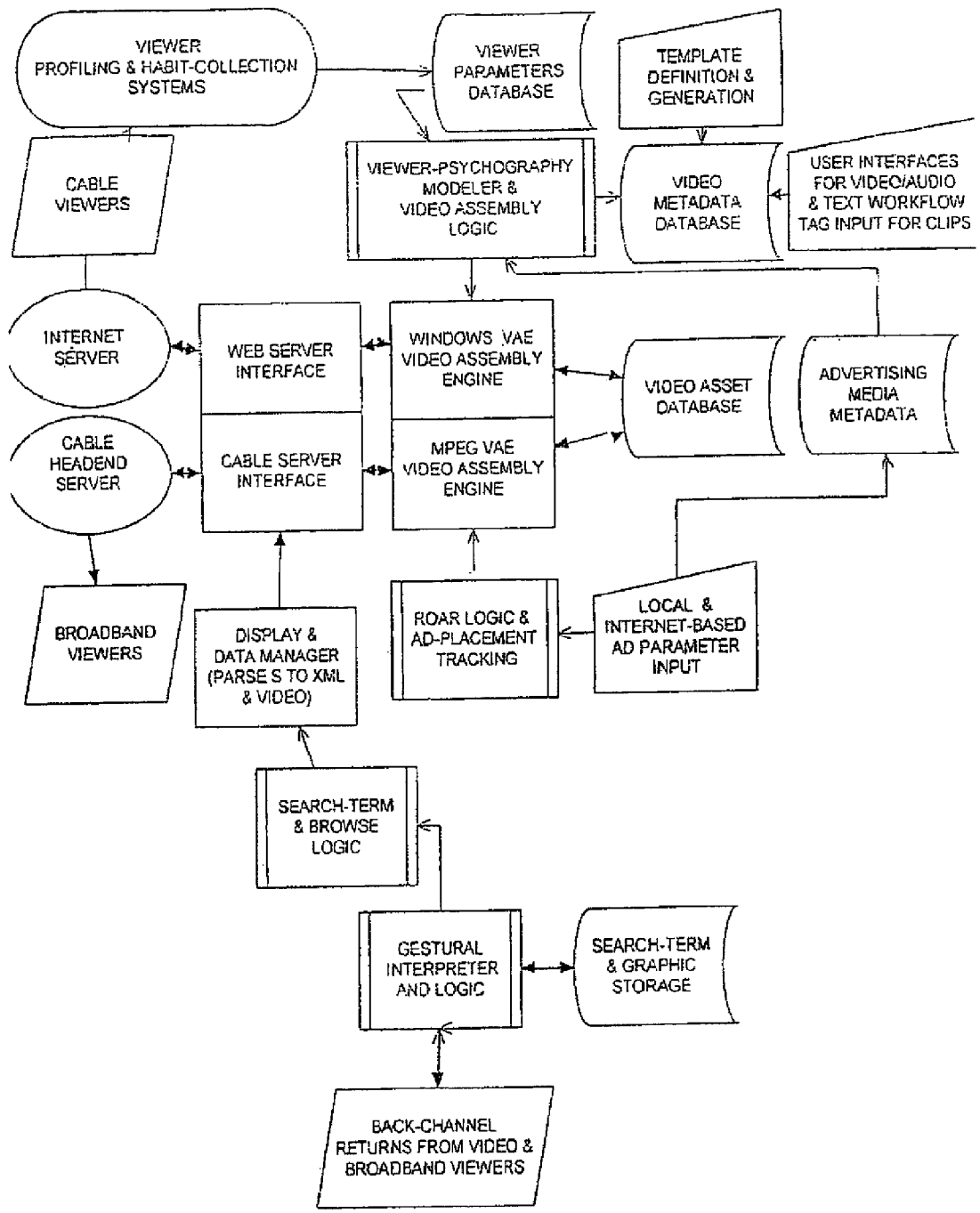
FIG. 3 is a data flow diagram in accordance with one embodiment of the present invention.

FIG. 2 illustrates an information display in accordance with one embodiment of the present invention. The display area 200 is partitioned into a current viewing area 210 and a menu of options area 220. The current viewing area 210 is used to display information the user is currently focusing on. This information may be a continuous program (e.g., a movie or show), or it may be a stream of short previews and/or ads. In one embodiment, the menu of options area 220 may be used as a traditional menu that allows the user to exercise control over what information is delivered.

In another embodiment, the menu of options area 220 is partitioned into a plurality of mini-display regions 230. In one embodiment, once a clip has displayed in the current viewing area 210, the clip continues to display in one of the mini-display regions 230. In one embodiment, the clip replays in a loop in the mini-display region 230 until it is replaced or selected. In another embodiment, a representation of the clip is displayed in the mini-display region 230 until it is replaced.

In one embodiment, clips cycle through the mini-display regions 230 so that the most recently displayed clip is in a first mini-display region and the least recently displayed clip is in a second mini-display region. When a new clip is moved to the menu of options area 220, the least recently displayed clip is replaced by the second least recently displayed clip in the corresponding mini-display region, and other clips are similarly moved to new mini-display regions until the old most recent clip is replaced by the new most recent clip. In another embodiment, the new most recent clip simply replaces the least recently displayed clip in the corresponding mini-display region.

In another embodiment, each mini-display region 230 displays a separate stream of information retrieved for a user. For example, one mini-display region may stream sports-related content while another streams content related to nostalgic ads from the 70's and 80's. In one embodiment, the user controls what content is delivered to each mini-display region by selecting from a list of general categories or channels. In another embodiment, the content delivered to each mini-display region is altered by the user's selections from that and/or other mini-display regions.

In one embodiment, the user selects information for display in the current viewing area 210 by selecting a clip either from a stream of clips delivered to the current viewing area 210 or to one of the mini-display regions 230. In one embodiment, the user has the ability to hide or display the menu of options area 220. Thus, a user can select a movie for viewing by selecting a clip of the movie from a stream of clips and then view the movie using the entire display area 200.

In one embodiment, clips are provided to the user at no cost. In another embodiment, the user pays to view certain clips. In one embodiment, the user pays through a debit to an account (similar to ordering a pay-per-view event). In another embodiment, the user pays by viewing other clips and/or information (e.g., an advertisement). In another embodiment, advertisers pay to have information inserted into the information packaged for streaming to a user, thereby subsidizing the user's information retrieval experience.

One example of methods, apparatus and systems, suitable for implementing the invention, is set forth in the Appendix attached hereto and which is specifically incorporated by reference herein.

Thus, a method and apparatus for efficient, entertaining information deliver is described in conjunction with one or more specific embodiments. It will be apparent from the foregoing that, while particular forms of the invention have been illustrated and described, various alternatives, modifications and variations can be made without departing from the spirit and scope of the invention. Accordingly, the invention is intended to embrace all such alternatives, modifications and variations and it is not intended that the invention be limited, except as by the appended claims.

What is claimed is:

1. A method of providing video programming to a user, comprising the steps of:

(a) receiving a first request for video programming at a computing device comprising a video server, by communication with a computing device associated with a user;

(b) searching one or more databases of video clips based on the first request, wherein each said database is in communication with said video server computing device;

(c) receiving one or more first search results at said video server computing device, wherein said first search results collectively correspond to a plurality of first video clips in said one or more databases, each of which is responsive to the first request, and wherein at least some of said responsive first video clips are each associated with one or more second video clips in said one or more databases;

(d) identifying a plurality of first transitional clips in said one or more databases for association with at least some of said responsive first video clips;

(e) defining first video programming comprising a selected plurality of said responsive first video clips and a selected plurality of first transitional clips that are concatenated according to a first temporal sequence;

(f) providing a presentation of said first video programming to a display associated with said user computing device;

(g) receiving an identification of a first video clip of said first video programming at said video server computing device;

(h) searching said one or more databases of video clips according to a second request for second video programming that is based at least in part on a stored association between the identified first video clip and at least one second video clip;

(i) receiving one or more second search results at said video server computing device, wherein said second search results collectively correspond to a plurality of second video clips in said one or more databases that are responsive to the second request, including at least one second video clip that is associated with the identified first video clip;

(j) identifying a plurality of second transitional clips in said one or more databases for association with at least some of said responsive second video clips;

(k) defining second video programming comprising a selected plurality of second video clips, including the designated second video clip, and a selected plurality of second transitional clips that are concatenated according to a second temporal sequence; and (j) presenting said second video programming to a display associated with said user computing device;

wherein at least one searching or defining step is performed according to one or more templates which collectively comprise a plurality of template variables comprising (a) information about a user associated with the second computing device, (b) viewing scenarios of two or more selected video clips in a temporal relationship to each other, and (c)"style requirements".

2. A method according to claim 1 wherein at least one of said video clips of said first or second video programming is a transitional clip.

3. A method according to claim 2, wherein at least one of said video clips of each of said first and second video programming is a transitional clip.

4. A method according to claim 3, wherein said transitional clip is a hosting clip consistent with at least one template variable.

5. A method according to claim 3, wherein at least one transitional clip is a hosting clip consistent with at least one template variable.

6. A method according to claim 2, wherein said first or second template variables corresponding to viewing scenarios comprise sequencing limitations for incorporating video clips at specific locations in the first or second video programming.

7. A method according to claim 6, wherein the sequencing limitations comprise at least one of length requirements, requirements for presenting a set of associated video clips in a predetermined order, and requirement for presenting a set of associated video clips within a predetermined time frame.

8. A method according to claim 6, wherein one or more video clips comprise advertising.

9. A method according to claim 6, wherein information about the user comprises at least one of demographic information, psychographic information, and a viewing history.

10. A method according to claim 6, wherein the step of selecting a second video clip based on said association with at least one first video clip is performed according to at least one of the first or second templates.

11. A method according to claim 6, wherein said stored associations between said video clips comprise a plurality of media tags.

12. A method according to claim 6, wherein said media tags comprise a plurality of information selected from at least some of context, subject matter, source, region, language, sponsorship, demographics, psychographics, and viewing history.

13. A method according to claim 1, wherein said first and second video programming are each presented as a stream of information to the user.

14. A method according to claim 1, wherein said first or second template variables corresponding to viewing scenarios comprise sequencing limitations for incorporating video clips at specific locations in the first or second video programming.

15. A method according to claim 14, wherein the sequencing limitations comprise at least one of length requirements, requirements for presenting a set of associated video clips in a predetermined order, and requirement for presenting a set of associated video clips within a predetermined time frame.

16. A method according to claim 1, wherein one or more video clips comprise advertising.

17. A method according to claim 1, wherein information about the user comprises at least one of demographic information, psychographic information, and a viewing history.

18. A method according to claim 1, wherein the step of selecting a second video clip based on said association with at least one first video clip is performed according to at least one of the first or second templates.

19. A method according to claim 1, wherein said stored associations between said video clips comprise a plurality of media tags.

20. A method according to claim 1, wherein said media tags comprise a plurality of information selected from at least some of context, subject matter, source, region, language, sponsorship, demographics, psychographics, and viewing history.

* * * * *